United States Patent
Imai et al.

(10) Patent No.: US 8,717,314 B2
(45) Date of Patent: May 6, 2014

(54) HOLDING STRUCTURE FOR A TOUCH PANEL

(75) Inventors: Kazuo Imai, Toyama (JP); Shinya Iwawaki, Toyama (JP); Takayuki Mizuki, Toyama (JP)

(73) Assignee: SMK Corporation, Tokyo (JP)

( * ) Notice: Subject to any disclaimer, the term of this patent is extended or adjusted under 35 U.S.C. 154(b) by 822 days.

(21) Appl. No.: 12/898,693

(22) Filed: Oct. 5, 2010

(65) Prior Publication Data
US 2011/0102341 A1 May 5, 2011

(30) Foreign Application Priority Data

Nov. 2, 2009 (JP) ................................. 2009-252059
Nov. 12, 2009 (JP) ................................. 2009-259031
Nov. 30, 2009 (JP) ................................. 2009-271579

(51) Int. Cl.
*G06F 3/041* (2006.01)

(52) U.S. Cl.
USPC ......................................................... 345/173

(58) Field of Classification Search
USPC .......................................................... 345/173
See application file for complete search history.

(56) References Cited

U.S. PATENT DOCUMENTS

2006/0192657 A1   8/2006   Nishimura et al.
2008/0246741 A1 * 10/2008   Hinata .......................... 345/173

FOREIGN PATENT DOCUMENTS

| JP | 07-105781 A | 4/1995 |
| JP | 09-115378 A | 5/1997 |
| JP | 2000-276254 A | 10/2000 |
| JP | 2002-229672 A | 8/2002 |
| JP | 2006-227712 A | 8/2006 |

OTHER PUBLICATIONS

Applicants bring the attention of the Examiner to the following pending U.S. applications; U.S. Appl. No. 12/899,479, filed Oct. 6, 2010, U.S. Appl. No. 12/898,700, filed Oct. 5, 2010.

* cited by examiner

*Primary Examiner* — Dwayne Bost
*Assistant Examiner* — Scott Trandai

(57) ABSTRACT

A holding structure for a touch pane has a display panel for forming a display screen, a touch panel for allowing an input operation, a piezoelectric device for applying vibration to the touch panel in accordance with the operation of the touch panel, a casing for accommodating the display panel and the touch panel and a protective sheet having a size larger than the touch panel. The casing has an opening through which the touch panel is exposed. The protective sheet is applied to an entire front surface of the touch panel. The protective sheet has a non-bonded portion at a peripheral edge. The non-bonded portion is not bonded partly to at least one of a peripheral edge of the touch panel and a peripheral edge of the opening of the casing.

14 Claims, 10 Drawing Sheets

HOLDING STRUCTURE FOR A TOUCH PANEL

CROSS REFERENCE TO RELATED APPLICATION

The contents of the following patent applications are incorporated herein by reference,
NO. 2009-252059 filed on Nov. 2, 2009,
NO. 2009-259031 filed on Nov. 12, 2009, and
NO. 2009-271579 filed on Nov. 30, 2009.

BACKGROUND

1. Technical Field

This invention relates to a holding structure for a touch panel, which is provided to a display or an operation unit of a variety of electronic devices and being used as an input device.

2. Description of the Related Art

Conventionally, electronic devices having a touch panel function as input means at the display surface have been used widely. One of the structures of the touch panels was a resistance-sensitive type. In the resistance-sensitive touch panel, usually a transparent ITO (indium oxide) film is formed on the glass surface of the touch panel in a predetermined pattern. Electrodes are connected to the end portion of the ITO film and the peripheral edge is coated by overcoating. And dot spacers are provided between the upper and lower panel substrates both on which ITO films are deposited. When an operator presses the surface of the touch panel, the ITO films on the upper and lower panels get in contact with each other. The pressed position on the panel is detected in accordance with the resistance value at that time.

In the touch panel device, as it is disclosed in Japanese Patent Application Publication No. 07-105781, the touch panel and the front surface of the liquid crystal display panel or the like are applied to each other at the entire surface using a transparent acrylic adhesive. In this way, by eliminating the interspace between the touch panel and the liquid crystal display panel, the Newton rings or the glare due to the distortion of the touch panel substrate during operation or the like are prevented from generation.

In addition, the touch panel device is disposed in pile on the liquid crystal display panel or the like, and an operator carries out the input operation by directly touching such display surface. Even though the ITO films on the upper and the lower panel substrates get in contact with each other when an operator presses the surface of the touch panel, the operator can neither feel nor be sure whether the contact is closed or not. And so, there is a touch panel with a so-called force feedback function which vibrates the touch panel by detecting the pressing operation and gives an operator an operation feeling. As it is shown in FIG. 8, the touch panel device equipped with the force feedback function is applied, for example, to the display of handheld information equipment or the like, and is composed of the liquid crystal panel 2 and the touch panel 4 being accommodated in the casing 6 made of resin or the like. Piezoelectric devices 3 for the force feedback function are equipped at the side edge of the touch panel 4. And elastic supporting portions 5 made of rubber or the like are provided at the four corners between the liquid crystal panel 2 and the touch panel 4 in the casing 6. The elastic supporting portions absorb the vibration of the touch panel 4 due to the piezoelectric devices 3 and hold the touch panel 4.

In addition, as it is shown in FIG. 8, in order to enhance the dust-proof feature and the visual design, in some touch panels, a transparent protective sheet 7 is disposed on the outer front surface of the touch panel 4. The protective sheet 7 is applied in order to cover simultaneously the touch panel 4 and the opening 6a of the casing 6. As it is shown in FIG. 9 and FIG. 10, the protective sheet 7 is bonded to the front surface of the touch panel 4 with a transparent acrylic adhesive 8 or the like being applied on the entire front surface of the touch panel 4. Moreover, as it is shown in FIG. 11, the peripheral edge of the protective sheet 7 is bonded with the opening peripheral edge 6b being the periphery of the opening 6a of the casing 6 at the entire corresponding peripheral surface by the adhesive 9.

In the case of the holding structure for a touch panel described in the related art mentioned above, since the protective sheet 7 is applied to the touch panel 4 on the entire front surface, there was a problem that the vibration of the touch panel 4 was restricted, the vibration amplitude became smaller and the damping appeared fast, so that the sufficient force feedback function could not be demonstrated because of the bonding with the protective sheet 7 when the piezoelectric devices 3 vibrated in order to demonstrate the force feedback function due to the piezoelectric devices 3. Similarly, because the peripheral edge of the protective sheet 7 was bonded with the opening peripheral edge 6b of the casing 6 at the entire corresponding peripheral surface, this made the vibration due to the piezoelectric devices 3 absorbed and damped so that the force feedback function was diminished.

SUMMARY

The present invention is achieved in consideration of the problems of the related arts mentioned above. The purpose of the present invention is to provide a holding structure for a touch panel with a simple composition preventing the vibration due to the piezoelectric devices for the force feedback function from damping and capable of effective transmission of the vibration of the touch panel to an operator.

According to one aspect related to the innovations herein, one exemplary holding structure for a touch panel may include a display panel for forming a display screen, a touch panel disposed outside the display panel for allowing an input operation, a piezoelectric device disposed at a side edge of the touch panel for applying vibration to the touch panel in accordance with the operation of the touch panel, a casing for accommodating the display panel and the touch panel with an opening through which the touch panel is exposed, and a protective sheet having a size larger than the touch panel with being applied to a peripheral edge of the opening of the casing as well as an entire front surface of the touch panel. A non-bonded portion is provided at the peripheral edge of the protective sheet. The non-bonded portion is not bonded partly to at least one of a peripheral edge of the touch panel and a peripheral edge of the opening of the casing.

The non-bonded portion is provided to at least one side of the peripheral edge of the touch panel. In addition, it is preferable that the non-bonded portion is provided to the entire peripheral edge of the touch panel.

The non-bonded portion is provided to at least one side of a peripheral edge of the opening of the casing. In addition, it is preferable that the non-bonded portion is provided to the entire peripheral edge of the opening of the casing.

Since at least one of the peripheral edge of the touch panel and the peripheral edge of the opening of the casing is not bonded partly to the protective sheet, the damping of the vibration by the piezoelectric devices due to the bonding of the protective sheet with the touch panel is restricted and the holding structure for a touch panel related to the present invention can effectively demonstrate the force feedback function of the touch panel.

Especially, by providing a non-bonded portion at the protective sheet applied to the front surface of the touch panel, the peripheral edge of the touch panel and the peripheral edge of the opening of the casing, the damping of the vibration by the piezoelectric device due to the bonding of the protective sheet with the casing is restricted and the force feedback function of the touch panel can be effectively demonstrated.

DESCRIPTION OF EXEMPLARY EMBODIMENTS

Figure 1:
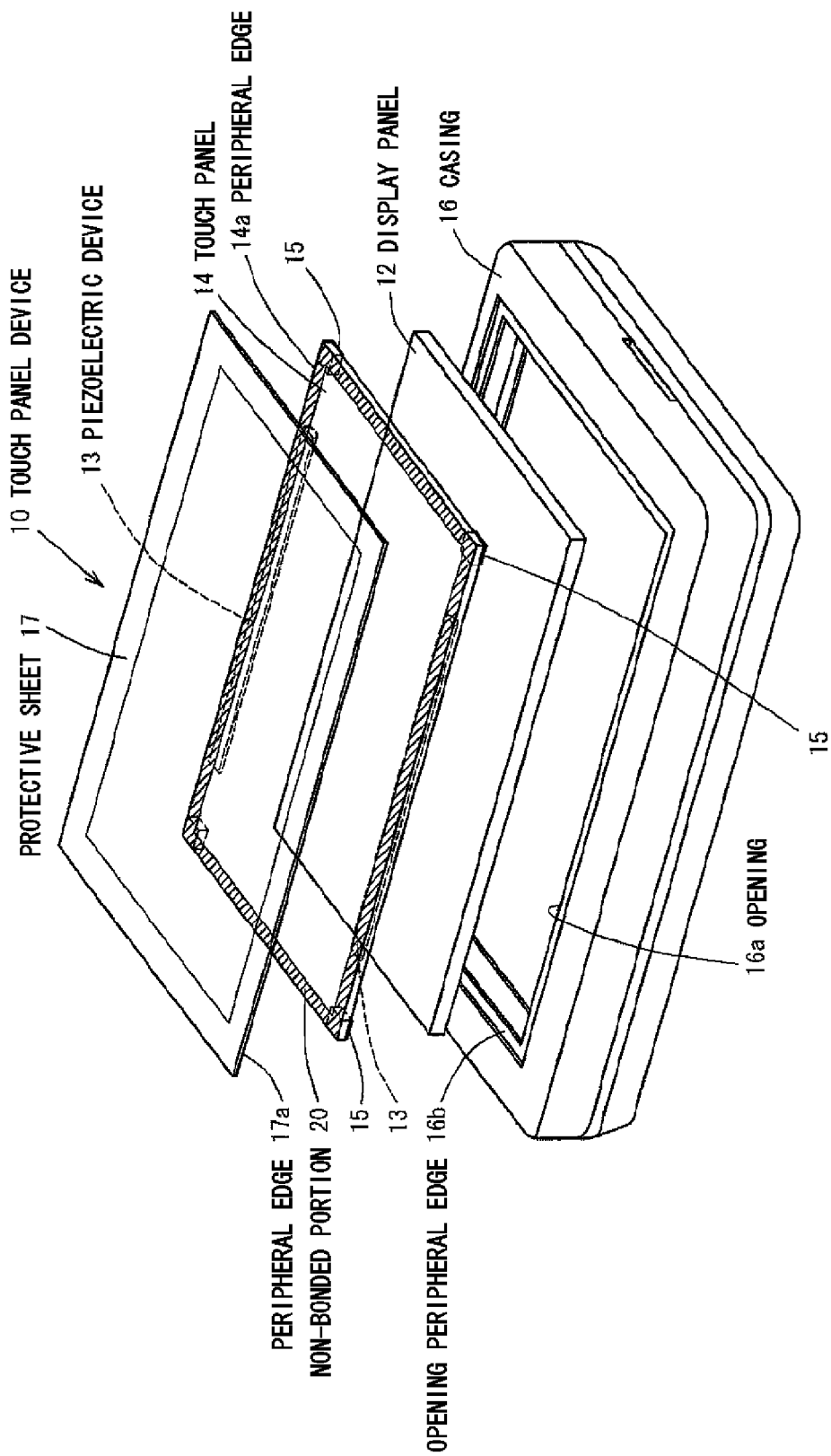
FIG. 1 shows an exploded perspective view of a touch panel device in accordance with a first embodiment of the present invention.
Figure 2:
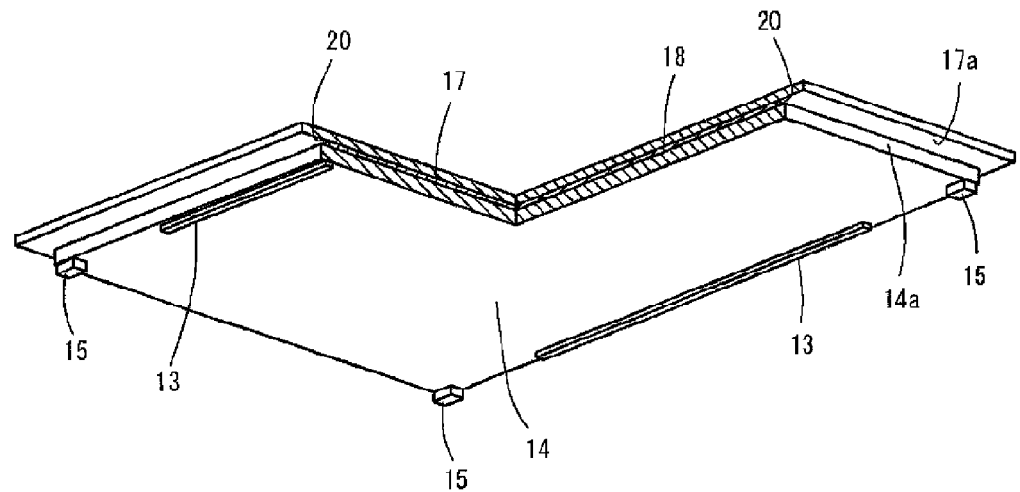
FIG. 2 shows a partial cutaway perspective view of the holding structure for a touch panel in accordance with the first embodiment of the present invention.
Figure 3:
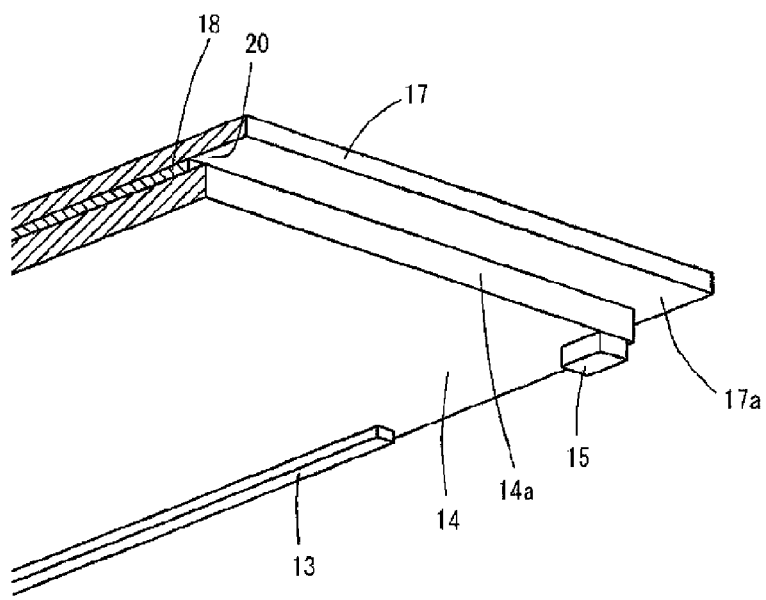
FIG. 3 shows an enlarged partial cutaway perspective view of the holding structure for a touch panel in accordance with the first embodiment of the present invention.
Figure 4:
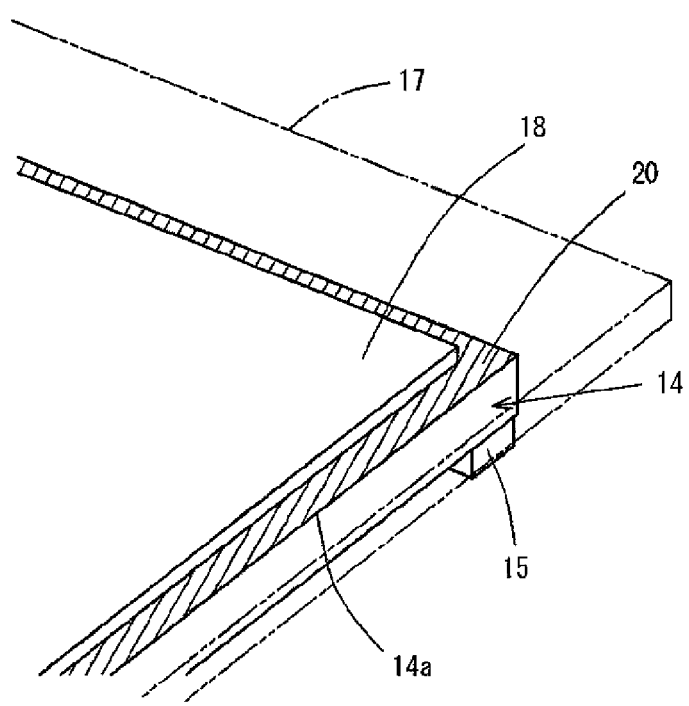
FIG. 4 shows an enlarged partial cutaway perspective view seen from the other angle, of the holding structure for a touch panel in accordance with the first embodiment of the present invention.

Hereinafter, the embodiments related to the present invention are to be explained based upon Figures. FIG. 1, FIG. 2, FIG. 3 and FIG. 4 show a first embodiment related to the present invention. The touch panel device 10 in the embodiment illustrates an embodiment used in a portable information terminal device. Moreover a touch panel is used in such various display panels as a computer display, a vehicle navigation device, an automated teller machine, a ticket vending machine serving as an input device. The touch panel device 10 is provided with a display panel 12 used for a liquid crystal display panel or an electroluminescence display panel or the like and a touch panel 14 for allowing an input operation, and has a casing 16 molded by resin or the like accommodating the display panel 12 and the touch panel 14. Furthermore, the casing 16 accommodates a circuit board, a power source unit or other electronic components, which are not illustrated here.

The structure of the touch panel 14 is in the public domain. Transparent ITO film is formed by deposition or others in a predetermined pattern on a substrate made of, for example, PET resin or glass. Electrodes are attached to the end portion of the ITO film. Dot spacers are disposed between the upper and lower panels both on which ITO films are formed and the panels are being faced each other. When an operator presses the front surface of the touch panel 14, the ITO films on the both panels get into contact with each other. The pressed position on the touch panel 14 can be detected in accordance with the resistance value at that time.

A predetermined length of piezoelectric device 13 is attached to a pair of sides facing each other of the side edge of the touch panel 14 respectively in order to demonstrate the force feedback function. The length of the piezoelectric device 13 is not necessary to be the entire side length of the touch pane 14, however, it is preferable that the length is about equal to or longer than half of the side length. The piezoelectric device 13 is buried in the elastic adhesive and bonded to the touch panel 14.

Between the display panel 12 and the touch panel 14 in the casing 16, supporting portions 15 that are made of such elastic member as rubber are provided at the four corners. The supporting portions 15 absorb the vibration of the touch panel 14 due to the piezoelectric devices 13 and hold the touch panel 14.

Moreover, a transparent protective sheet 17 is provided to the outer front surface of the touch panel 14. The protective sheet 17 is applied to the touch panel 14 covering the opening 16a of the casing 16 as well as covering the touch panel 14. The protective sheet 17 is made of such resin as PET and is larger than the opening 16a, and prevents dust or moisture from entering through the opening 16a of the casing 16 by closing the opening 16a. The protective sheet 17 is applied to the entire front surface of the touch panel 14 using such transparent adhesive 18 as acrylic adhesive. A non-bonded portion 20 which is not bonded with the protective sheet 17 is provided to at least one part of or preferably to the entire peripheral edge 14a of the touch panel 14. Moreover, the peripheral edge 17a of the protective sheet 17 is applied to the opening peripheral edge 16b of the casing 16 using double-sided adhesive tape or other adhesives.

Each of the piezoelectric devices 13 is connected to a piezoelectric device driving circuit. The circuit gives rise to the vibration to the piezoelectric device 13 and gives a force feedback function which gives an operator an operating feeling. The circuit is not illustrated here. And a cable is connected to the electrodes at the side edge of the touch panel 14 so that the input information can be transmitted to the control unit in the casing 16. The cable is not illustrated here.

Hereinafter, the function and the effect of the holding structure for a touch panel of the touch panel device 10 in accordance with the embodiment is explained. Since the touch panel device 10 in accordance with the embodiment is formed as a non-bonded portion, which is a portion that at least one part or preferably the entire peripheral edge 14a of the touch panel 14 is not bonded with the protective sheet 17, the stiffness of the panel body due to the bonding of the protective sheet 17 with the touch panel 14 is softened and the damping of the vibration of the touch panel 14 due to the vibration of the piezoelectric devices 13 can be suppressed. As a result, the touch panel 14 can sufficiently and effectively demonstrate the force feedback function.

Figure 5:
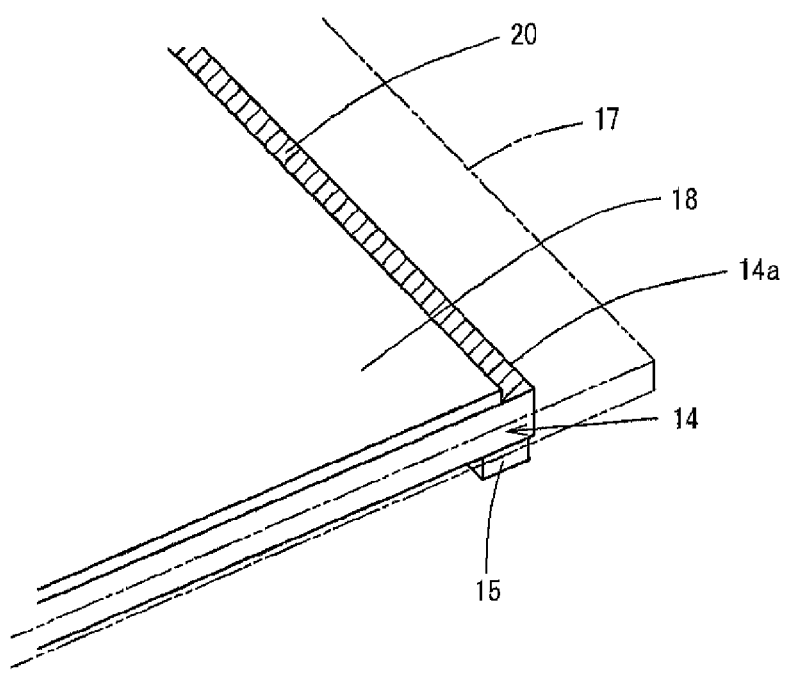
FIG. 5 shows an enlarged partial cutaway perspective view of the holding structure for a touch panel in accordance with a second embodiment of the present invention.

Hereinafter, the second embodiment of the holding structure for a touch panel related to the present invention is to be explained based upon FIG. 5. Here, the same symbols are allocated to the same or the similar members appeared in the embodiments mentioned above and the explanation is omitted. In the touch panel 14 in accordance with the embodiment, a non-bonded portion 20 which is not provided with adhesive 18 is formed at a pair of sides of the peripheral edge 14a of the front surface of the touch panel 14. In this case, the pair of sides are disposed perpendicular to the pair of the sides at which the piezoelectric devices 13 are provided.

The embodiment also gives the similar effect as the embodiments mentioned above. In addition, the non-bonded portion 20 is allowed to be formed at a pair of sides of the peripheral edge 14a where the piezoelectric devices 13 are provided. The non-bonded portion 20 is allowed to be formed at one side of the peripheral edge 14a of the touch panel 14. The non-bonded portion 20 is allowed to be provided so that the force feedback function of the touch panel 14 due to the vibration of the piezoelectric devices 13 works properly, and the non-bonded portion 20 can be provided appropriately at the peripheral edge 14a of the touch panel 14.

Figure 6:
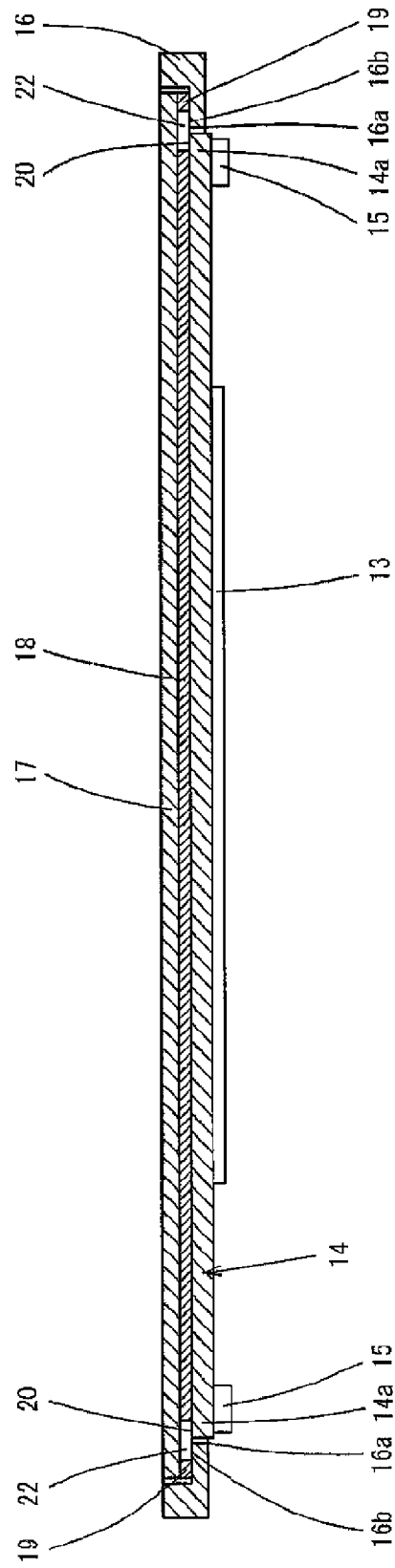
FIG. 6 shows a vertical cross-section view of the holding structure for a touch panel in accordance with a third embodiment of the present invention.

Hereinafter, the third embodiment of the holding structure for a touch panel related to the present invention is to be explained based upon FIG. 6. Here, the same symbols are allocated to the same or the similar members appeared in the embodiments mentioned above and the explanation is omitted. In the touch panel 14 in accordance with the embodiment, the non-bonded portion 20 is formed at the entire peripheral edge 14a of the touch panel 14. And also at the front surface side of the peripheral edge 16b of the opening of the casing 16, a portion bonded by the adhesive 19 at the entire peripheral edge 17a of the protective sheet 17 and a non-bonded portion 22 where no bonding is executed are provided to the entire periphery. In the embodiment, since the non-bonded portion 22 with the protective sheet 17 is formed at the peripheral edge 16b of the opening of the casing 16 in addition to the peripheral edge 14a of the touch panel 14, it is possible to give rise to the vibration of the touch panel 14 effectively and make the force feedback function work effectively.

Figure 7:
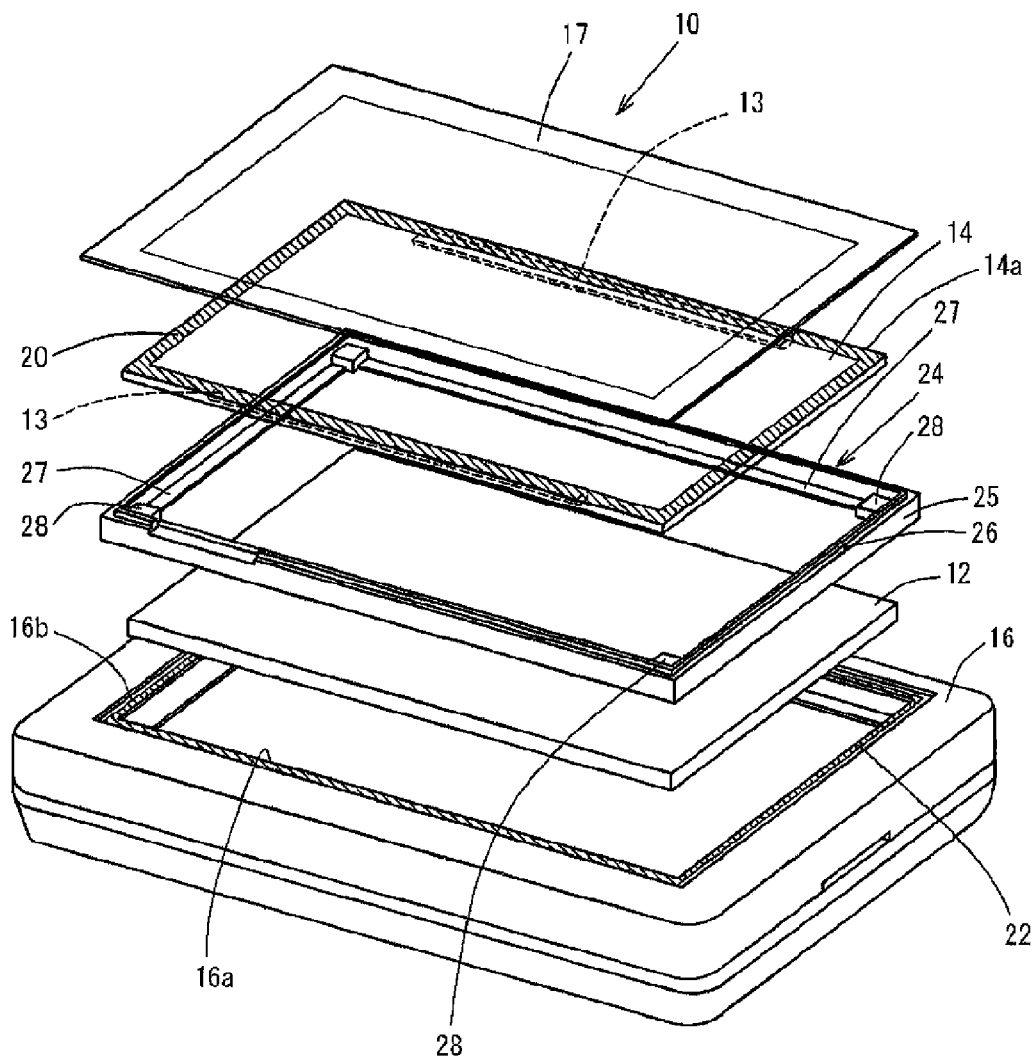
FIG. 7 shows an exploded perspective view of a touch panel device in accordance with a fourth embodiment of the present invention.
Figure 8:
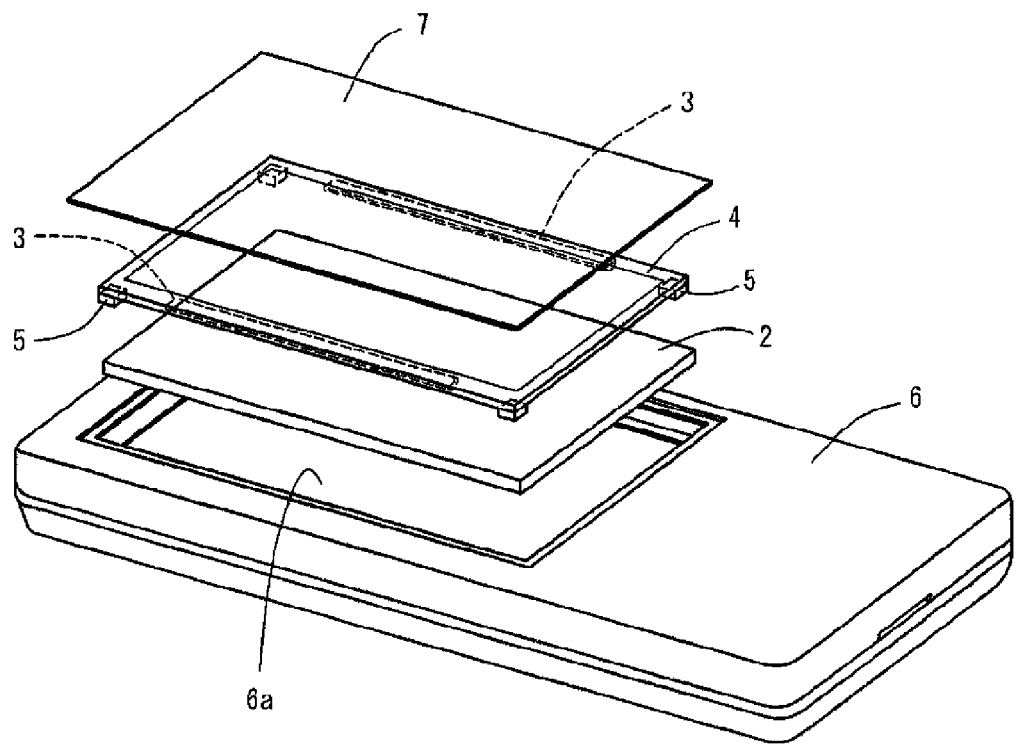
FIG. 8 shows an exploded perspective view of the conventional touch panel device.
Figure 9:
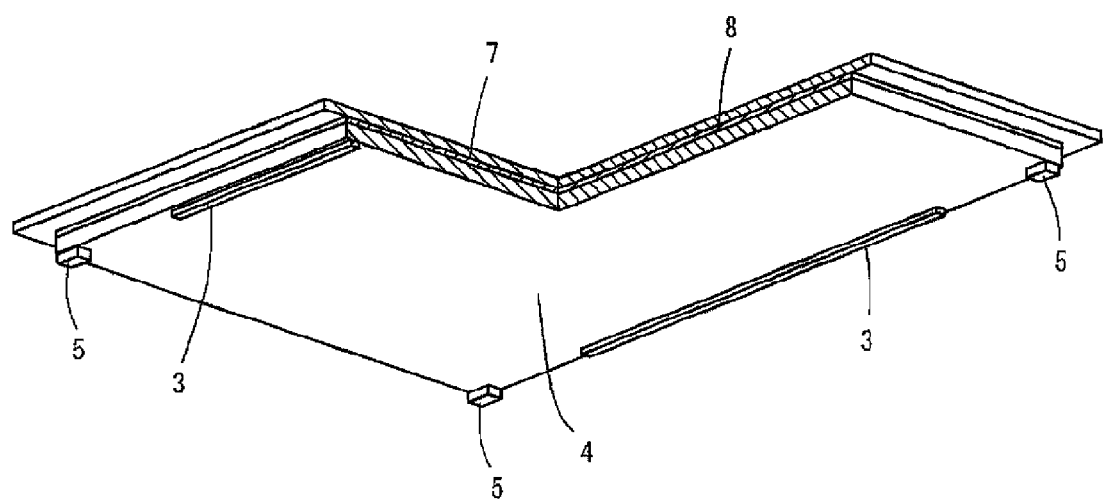
FIG. 9 shows a partial cutaway perspective view of the holding structure for the conventional touch panel.
Figure 10:
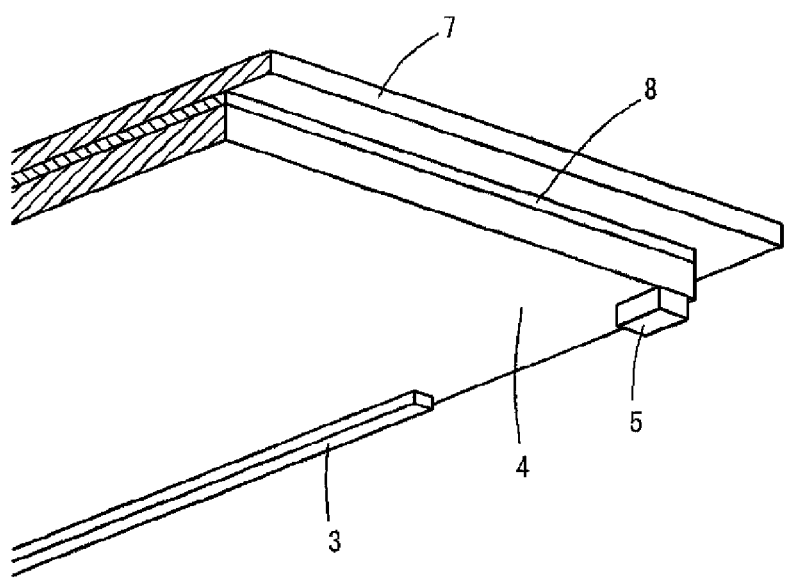
FIG. 10 shows an enlarged partial cutaway perspective view of the holding structure for the conventional touch panel.
Figure 11:
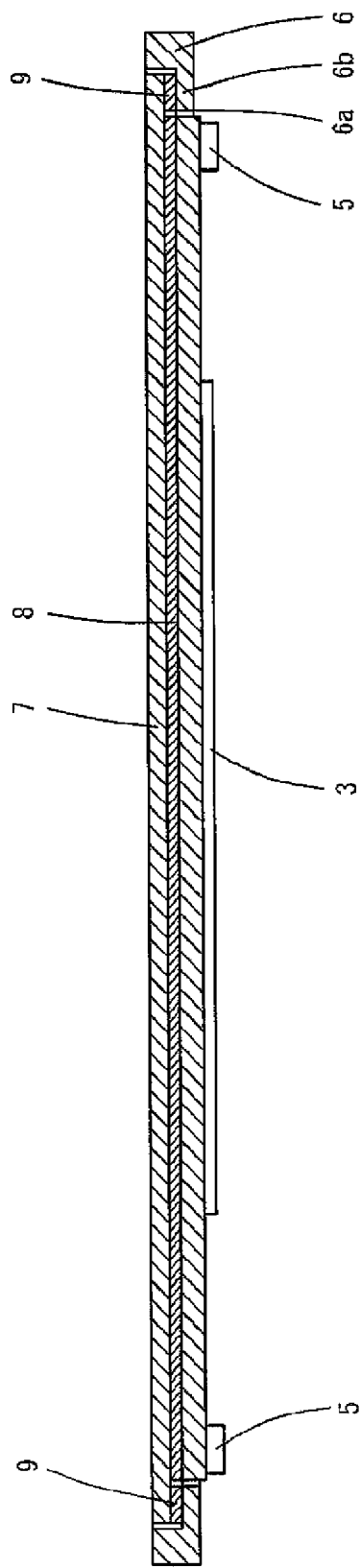
FIG. 11 shows a vertical cross-section view of the holding structure for another conventional touch panel.

Hereinafter, the fourth embodiment of the holding structure for a touch panel related to the present invention is to be explained based upon FIG. 7. Here, the same symbols are allocated to the same or the similar members appeared in the embodiments mentioned above and the explanation is omitted. In the embodiment, as it is shown in FIG. 7, the touch panel 14 and the display panel 12 are fitted in the elastic supporting frame 24 of certain strength and an elastic nature such as urethane rubber, silicone rubber, or Chloroprene rubber. The elastic supporting frame 24 is, as it is shown in FIG. 7, a frame of a rectangular shape. The elastic supporting frame 24 is provided with a sidewall portion 25 of a rectangular shape, a cutout 26 formed at the entire upper and outer peripheral edge of the sidewall portion 25, and a panel receiving portion 27 inwardly and entirely extending from the center portion of an inner peripheral surface of a side wall portion 25. The panel receiving portion 27 is perpendicular to the inner peripheral surface and having a constant width. The panel receiving portion 27 supports a display panel 12 at the rear surface side, and the touch panel supporting portions 28, which support the touch panel 14, are integrally formed at the four corners of the front side.

In the assembled state, the elastic supporting frame 24 is accommodated inside of the opening 16a of the casing 16, and disposed by the cutout portion 26 of the elastic supporting frame 24 being engaged with the rear side of the peripheral edge 16b of the opening. The display panel 12 is fitted into the frame of the elastic supporting frame 24 from the rear surface side, and disposed by the entire peripheral edge of the display panel 12 coming into contact with the receiving surface of the panel receiving portion 27. The peripheral edge of the display panel 12 and the display panel receiving portion 27 are to be bonded with an appropriate adhesive. The touch panel 14 is fitted to the panel receiving portion 27 of the elastic supporting frame 24 from the front side, and the touch panel 14 is elastically supported by the touch panel supporting portions 28 at the four corners. At the time, the piezoelectric devices 13 at the side edges of the touch panel 14 are to be accommodated in the step of the touch panel supporting portion 28.

The embodiment also gives the similar effect as the embodiments mentioned above. Moreover, since the display panel 12 and the touch panel 14 are held to the elastic supporting frame 24, high dust-proof feature and high drip-proof feature is achieved.

The holding structure for a touch panel in the present invention is not limited to the embodiments mentioned hereinbefore. The length or the site of the non-bonded portion is allowed to be set appropriately. The type of the touch panel is not limited to the resistance-sensitive type, but is allowed to be combined with other various types. The piezoelectric device for the force feedback purpose are allowed to be disposed at least one side, or at two sides or more.

What is claimed is:

1. A holding structure for a touch panel, comprising:
   a display panel for forming a display screen;
   a touch panel disposed outside the display panel, for allowing an input operation;
   a piezoelectric device disposed at a side edge of the touch panel, for applying vibration to the touch panel in accordance with the operation of the touch panel;
   a casing for accommodating the display panel and the touch panel, the casing having an opening through which the touch panel is exposed; and
   a protective sheet having a size larger than the touch panel, the protective sheet being applied to an entire front surface of the touch panel, wherein
   the protective sheet has a non-bonded portion at a peripheral edge thereof, the non-bonded portion being not bonded to a peripheral edge of the touch panel such that there is a space between the protective sheet and the peripheral edge of the touch panel at the non-bonded portion.

2. The holding structure for a touch panel according to claim 1, wherein
   the non-bonded portion is provided to at least one side of the peripheral edge of the touch panel.

3. The holding structure for a touch panel according to claim 2, wherein
   the non-bonded portion is provided to the entire peripheral edge of the touch panel.

4. The holding structure for a touch panel according to claim 1, wherein
   the protective sheet has a bonded portion that is bonded to the touch panel by an adhesive, and the space is bordered on at least one side by the adhesive.

5. A holding structure for a touch panel, comprising:
   a display panel for forming a display screen;
   a touch panel disposed outside the display panel, for allowing an input operation;
   a piezoelectric device disposed at a side edge of the touch panel, for applying vibration to the touch panel in accordance with the operation of the touch panel;
   a casing for accommodating the display panel and the touch panel, the casing having an opening through which the touch panel is exposed; and
   a protective sheet having a size larger than the touch panel, the protective sheet being applied to an entire front surface of the touch panel, wherein
   the protective sheet has a non-bonded portion at a peripheral edge thereof, the non-bonded portion being not bonded to a peripheral edge of the opening of the casing such that there is a space between the protective sheet and the peripheral edge of the opening of the casing at the non-bonded portion.

6. The holding structure for a touch panel according to claim 5, wherein
the non-bonded portion is provided to at least one side of a peripheral edge of the opening of the casing.

7. The holding structure for a touch panel according to claim 6, wherein
the non-bonded portion is provided to the entire peripheral edge of the opening of the casing.

8. The holding structure for a touch panel according to claim 5, wherein
the protective sheet has a bonded portion that is bonded to the opening of the casing by an adhesive, and the space is bordered on at least one side by the adhesive.

9. A holding structure for a touch panel, comprising:
a display panel for forming a display screen;
a touch panel disposed outside the display panel, for allowing an input operation;
a piezoelectric device disposed at a side edge of the touch panel, for applying vibration to the touch panel in accordance with the operation of the touch panel;
a casing for accommodating the display panel and the touch panel, the casing having an opening through which the touch panel is exposed; and
a protective sheet having a size larger than the touch panel, the protective sheet being applied to an entire front surface of the touch panel, wherein
the protective sheet has a non-bonded portion at a peripheral edge thereof, the non-bonded portion being not bonded to a peripheral edge of the touch panel and not bonded to a peripheral edge of the opening of the casing such that there is a space, at the non-bonded portion, between i) the protective sheet and ii) the peripheral edge of the touch panel and the peripheral edge of the opening of the casing.

10. The holding structure for a touch panel according to claim 9, wherein
the non-bonded portion is provided to at least one side of the peripheral edge of the touch panel.

11. The holding structure for a touch panel according to claim 10, wherein
the non-bonded portion is provided to the entire peripheral edge of the touch panel.

12. The holding structure for a touch panel according to claim 9, wherein
the non-bonded portion is provided to at least one side of a peripheral edge of the opening of the casing.

13. The holding structure for a touch panel according to claim 12, wherein
the non-bonded portion is provided to the entire peripheral edge of the opening of the casing.

14. The holding structure for a touch panel according to claim 9, wherein
the protective sheet has a first bonded portion that is bonded to the touch panel by an adhesive and a second bonded portion that is bonded to the opening of the casing by an adhesive, and the space is bordered on at least two sides by the adhesive of the first bonded portion and the adhesive of the second bonded portion, respectively.

* * * * *